(12) United States Patent
Lee et al.

(10) Patent No.: US 9,278,832 B2
(45) Date of Patent: Mar. 8, 2016

(54) METHOD OF REDUCING COMPUTATIONAL DEMAND FOR IMAGE TRACKING

(71) Applicants: Lun-Hui Lee, Taoyuan County (TW); Yen-Nung Lai, Taoyuan County (TW); Chung-Hao Huang, Taoyuan County (TW); Cheng-Yuan Chang, Taoyuan County (TW); Sung-Chih Ku, Taoyuan County (TW)

(72) Inventors: Lun-Hui Lee, Taoyuan County (TW); Yen-Nung Lai, Taoyuan County (TW); Chung-Hao Huang, Taoyuan County (TW); Cheng-Yuan Chang, Taoyuan County (TW); Sung-Chih Ku, Taoyuan County (TW)

(73) Assignee: INSTITUTE OF NECLEAR ENERGY RESEARCH, Longtan, Taoyuan (TW)

( * ) Notice: Subject to any disclaimer, the term of this patent is extended or adjusted under 35 U.S.C. 154(b) by 183 days.

(21) Appl. No.: 14/089,762

(22) Filed: Nov. 26, 2013

(65) Prior Publication Data
US 2015/0146916 A1   May 28, 2015

(51) Int. Cl.
G06K 9/00     (2006.01)
B66C 13/46    (2006.01)
G06T 7/00     (2006.01)
G06T 7/20     (2006.01)
B66C 13/06    (2006.01)

(52) U.S. Cl.
CPC ............ *B66C 13/46* (2013.01); *B66C 13/063* (2013.01); *G06T 7/0042* (2013.01); *G06T 7/2033* (2013.01)

(58) Field of Classification Search
None
See application file for complete search history.

(56) References Cited

U.S. PATENT DOCUMENTS

| 3,842,986 | A  | * | 10/1974 | Hupkes | 212/330 |
|---|---|---|---|---|---|
| 6,250,486 | B1 | * | 6/2001 | Enoki | 212/322 |
| 7,970,520 | B2 | * | 6/2011 | Gross | 701/50 |
| 2002/0108919 | A1 | * | 8/2002 | Uchida et al. | 212/275 |
| 2007/0261629 | A1 | * | 11/2007 | Choi | 114/312 |
| 2015/0183620 | A1 | * | 7/2015 | Hansen et al. | 212/273 |

* cited by examiner

*Primary Examiner* — Shefali Goradia

(57) ABSTRACT

A method of reducing computational demand for image tracking includes first receiving a plurality of images of a load hoisted with hanging wire in a preset transitional space, setting at least one monitoring point each at the load and the hanging wire, respectively, providing a tracking frame at the outer periphery of each monitoring point, allowing each tracking frame to track on its corresponding monitoring point that each monitoring point is kept on a relative location within each corresponding tracking frame, and producing the same displacement as that of the monitoring point, and lastly computing the displacement of each tracking frame thus obtaining the displacement of each monitoring point in correspondence to the tracking frame to calculate various displacement of the hanging wire and the load, respectively. With this image tracking method, the processing quantity of whole image data is effectively decreased and computational demand of equipments is reduced.

6 Claims, 6 Drawing Sheets

METHOD OF REDUCING COMPUTATIONAL DEMAND FOR IMAGE TRACKING

BACKGROUND OF THE INVENTION

1. Field of the Invention

The present invention relates to a method of reducing computational demand for image tracking, in particular relates to a method capable of reducing the amount of image data to reduce computational demand, system requirement, and implementation costs.

2. Description of Related Art

A conventional way for operating transitional hoisting crane, for example, an overhead crane, used to utilize manual control levers or buttons by operator. However, the manual control is deficient to adjust the position and the movement speed of the overhead crane accurately to fulfill precision requirements. One of conventional way for operating transitional hoisting crane is by automatic control which drives the overhead crane to a predetermined position with setting coordinates through controlling circuit and calculating unit. Taiwan patent number I279389 disclosed a crane that includes a movement control unit, an encoder, and a GPS (Global Positioning System) connecting to a remote central computer with wireless device to receive the command from the remote central computer for moving the crane to a designated position through the encoder and the movement control unit.

Although the method of automatic control for driving server motor by computer encoder as disclosed above improved the accuracy of overhead crane operation, however, the problem existing in both manual control and automatic control is the offset occurred between the load and the overhead crane due to inertia of the load and flexibility of the wire during the movement of the overhead crane. The offset further causes a swing of the load to lead to an abnormal movement of the overhead crane with industrial accident such as the load dropped or collision. Therefore, it is desirable to protect the hoisted load from over swing during the movement.

The inventors of the present invention are currently researching in the field of monitoring the position of the load and the overhead crane by real time image tracking and take the displacement of the load and the overhead crane as parameter for controlling transitional hoisting crane to diminish the swing of the load. However, the conventional image processing capacity is deficient in performing the method aforementioned.

FIG. 1 shows a swing of a hoisted load occurred during movement operation, wherein the load B produces displacement x1, y1, and z1 along X-axis, Y-axis, and Z-axis with respect to the hoisting position A. According to the research of the inventors of the present invention, real time image tracking provides parameter for controlling transitional hoisting crane to diminish the swing of the load. In accurately manage the displacement variation between the load B and the hoisting position A, a plurality of cameras are installed for receiving a plurality of images of each plane to obtain the displacement of the load B relative to the hoisting position A in the three-dimensional space respectively, and calculate in real time the images taken from at least two planes that vary in the three-dimensional coordinates.

Furthermore, the conventional real time image tracking system uses expensive, high-speed, and high-resolution cameras to reach an immediate and precise effect of image tracking. As a result, not only the cost of equipment acquisition is increased, but also a high performance and high memory capacity and processing unit is required for increasingly computational demand of data processing and transmission.

Therefore, there is a need in the art to provide features for image tracking and reducing the amount of image data to resolve the technical difficulties in data processing.

SUMMARY OF THE INVENTION

The primary object of present invention is to provide a method of reducing computational demand for image tracking that includes setting at least one monitoring point each at the load and the hanging wire, respectively, providing a tracking frame at the outer periphery of each monitoring point, allowing each tracking frame to track on its corresponding monitoring point and produce the same displacement as that of the monitoring point, calculating the displacement of the hanging wire and the load, thus effectively decreasing processing quantity of image data and reducing computational demand as a whole.

Another objective of the present invention is to deregulate specification requirement for hardware equipment and cost down the procurement of facility through decreasing processing quantity of images.

Another objective of the present invention is to provide technical features include a) receiving a plurality of images of a load hoisted with hanging wire in a preset transitional space, b) setting at least one monitoring point each at the load and the hanging wire, respectively, c) providing a tracking frame at the outer periphery of each monitoring point, d) allowing each tracking frame to track on its corresponding monitoring point and produce the same displacement as that of the monitoring point, and e) computing the displacement of each tracking frame thus obtaining the displacement of each monitoring point in correspondence to the tracking frame to calculate various displacement of the hanging wire and the load, respectively.

Another objective of the present invention is to provide features to set a monitoring point each at the hanging wire and the load, respectively, and provide an upper tracking frame at the outer periphery of the monitoring point of the hanging wire and a lower tracking frame at the outer periphery of monitoring point of the load.

Another objective of the present invention is to provide features that the setting range of the upper tracking frame is smaller than that of the lower tracking frame.

Another objective of the present invention is to provide features that each of the monitoring point is kept on a relative position of each corresponding tracking frame to carry out tracking of each monitoring point by each corresponding tracking frame.

Another objective of the present invention is to provide features that each monitoring point is kept on a fixed position within each corresponding tracking frame.

Another objective of the present invention is to provide features that each monitoring point keeps a fixed distance from a default border line within each corresponding tracking frame.

Another objective of the present invention is to provide features that a fixed reference point is provided on the background of the preset transitional space with a reference frame at outer periphery of the reference point for aid of comparing the displacement with each monitoring point and each tracking frame.

The above and other objects, features and advantages of the present invention will become apparent from the following detailed description taken with the accompanying drawings.

DETAILED DESCRIPTION OF THE PREFERRED EMBODIMENT

Figure 1:
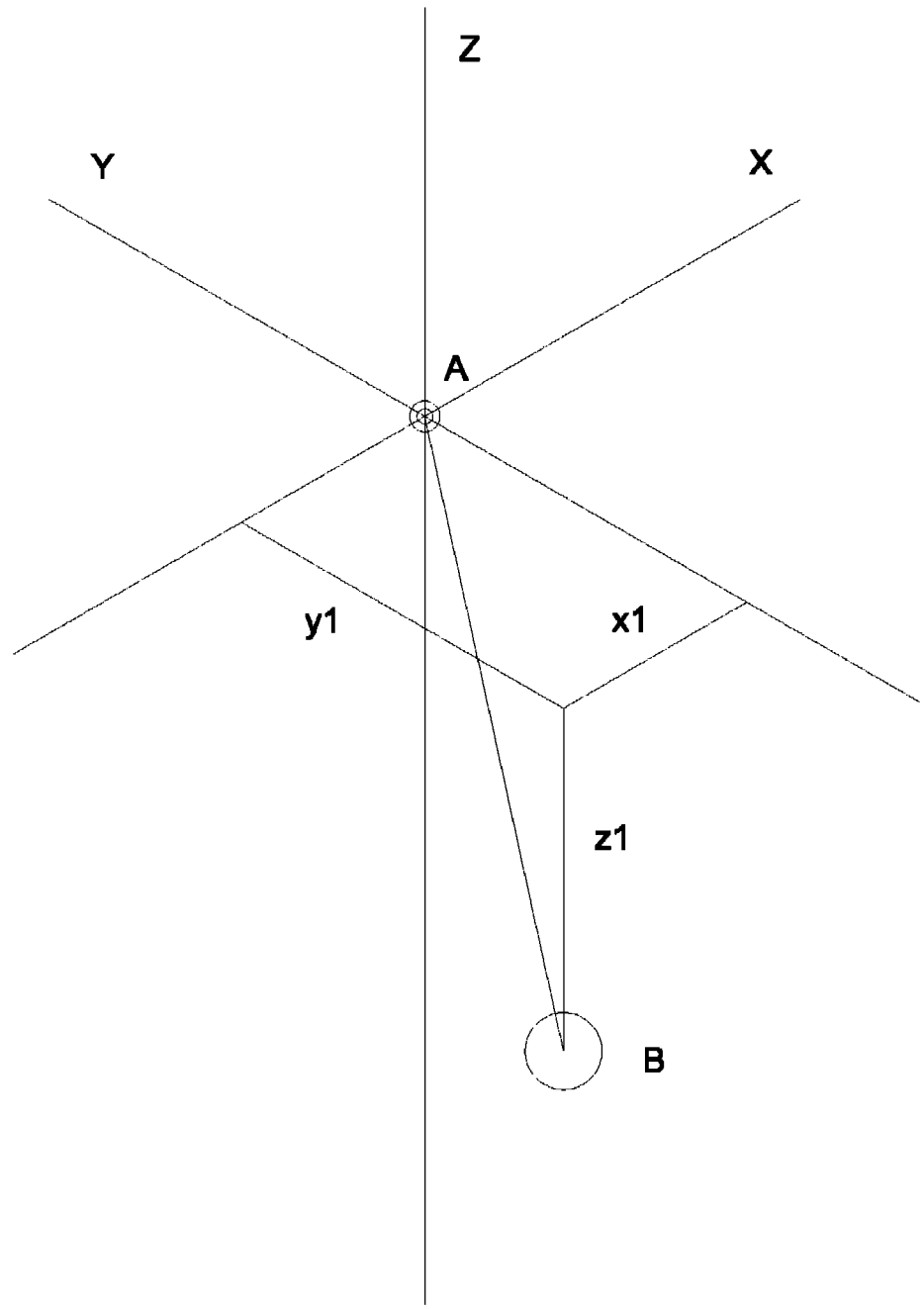
FIG. 1 shows a schematic diagram of a swing of a hoisted load produced during transitional process.
Figure 2:
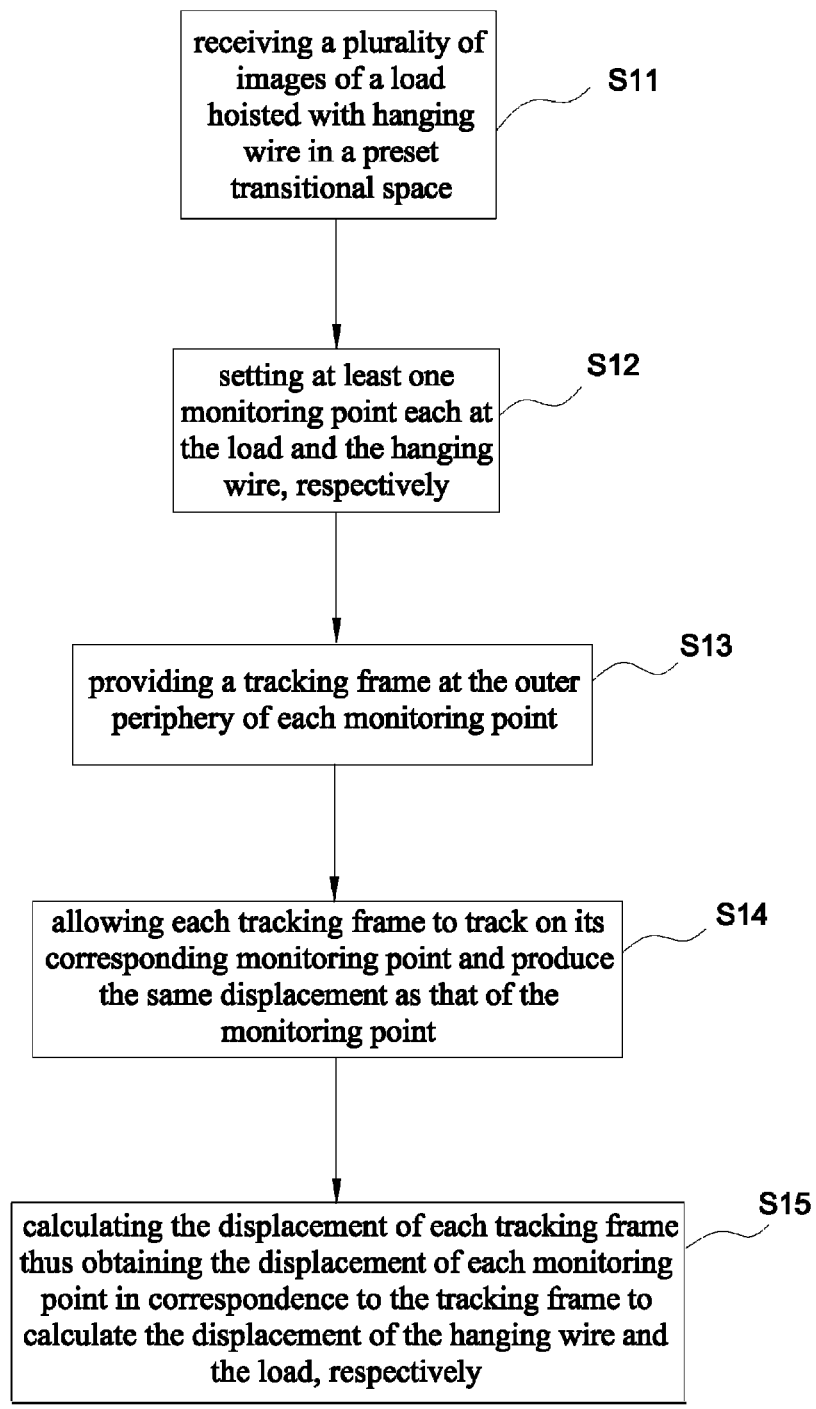
FIG. 2 shows an operational flow diagram of the present invention.

FIGS. 2 to 5 depicting the present invention comprises steps of: step 11) receiving a plurality of images of a load hoisted with hanging wire in a preset transitional space; step 12) setting at least one monitoring point each at the load and the hanging wire, respectively; step 13) providing a tracking frame at the outer periphery of each monitoring point; step 14) allowing each tracking frame to track on its corresponding monitoring point and produce the same displacement as that of the monitoring point; and step 15) calculating the displacement of each tracking frame thus obtaining the displacement of each monitoring point in correspondence to the tracking frame to calculate the displacement of the hanging wire and the load, respectively.

In the step 11), it is to use a camera to receiving a plurality of images of transitional hoisting equipment C (such as head crane) that hoists a load with hanging wire in a preset transitional space.

In the step 12) and the step 13), it is to provide a monitoring point 1 on the hanging wire L with an upper tracking frame 11 at its outer periphery, and the monitoring point 1 is kept on a corresponding fixed position within the upper tracking frame 11, for example, the monitoring point 11 is kept on a fixed position within the upper tracking frame 11, or the monitoring point 1 keeps a fixed distance from a default border line within the corresponding upper tracking frame 11, which is preset with a default position P1. A monitoring point 2 is provided on the load D with a lower tracking frame 21 at its out periphery and the monitoring point 2 is kept on a corresponding fixed position within the lower tracking frame 21 which is preset with a default position P2. In one embodiment, a plurality of monitoring points and tracking frames are provided on the hanging wire L and the load D, respectively, to meet various needs of image tracking embodiments.

In the step 14), the load D swings with inertia of its own weight due to acceleration or deceleration occurred during the transition process of the transitional hoisting equipment C, causing a skew state of the hanging wire L. The monitoring point 1 and 2 produce displacement according to the position variations of the hanging wire L and the load D, and then the upper tracking frame 11 and the lower tracking frame 21 move to superimpose over the monitoring point 1 and 2 from the default position P1 and P2, respectively. When the upper tracking frame 11 and the lower tracking frame 21 fully superimpose over the monitoring point 1 and 2, the offset positions of the upper tracking frame 11 and the lower tracking frame 21 are set as P11 and P21, respectively.

In the step 15), it is to compare the offset position P11 of the upper tracking frame 11 with the default position P1, and to compare the offset position P21 of the upper tracking frame 21 with the default position P2 to obtain the displacement of the hanging wire L and the load D occurred in the transition process of the transitional hoisting equipment C.

The displacement of the hanging wire L and the load D is calculated by comparing the movement amount of the upper tracking frame 11 and the lower tracking frame 21 with the whole image size, while the upper tracking frame 11 and the lower tracking frame 21 were following the monitoring point 1 and 2, respectively, and thus the function of image tracking for head crane control is achieved. The images other than the upper tracking frame 11 and the lower tracking frame 21 are considered as background to be ignored for reducing the processing amount of the image data.

Therefore, the reduction of the image data for processing that makes flat price household equipment may also meet the requirements of image tracking operation, thus to decrease the cost of equipment acquisition for image tracking control system.

Furthermore, the range of the lower tracking frame 21 is provided larger for the load D that produces larger swings during the transitional process, and the range of the upper tracking frame 11 is provided smaller for the hanging wire L produces smaller swings during the transitional process to further reduce the amount of data.

Figure 3:
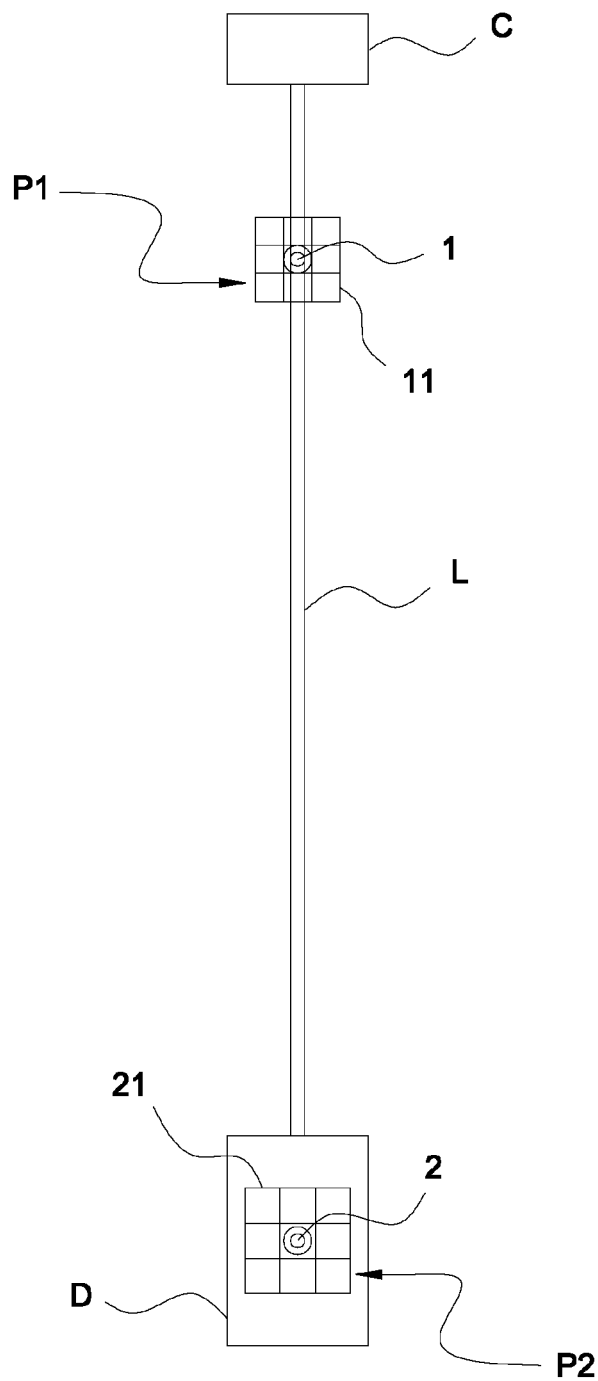
FIG. 3 shows a schematic diagram of a monitoring point set at the load and the hanging wire, respectively, with a tracking frame at the outer periphery of each monitoring point of the present invention.
Figure 4:
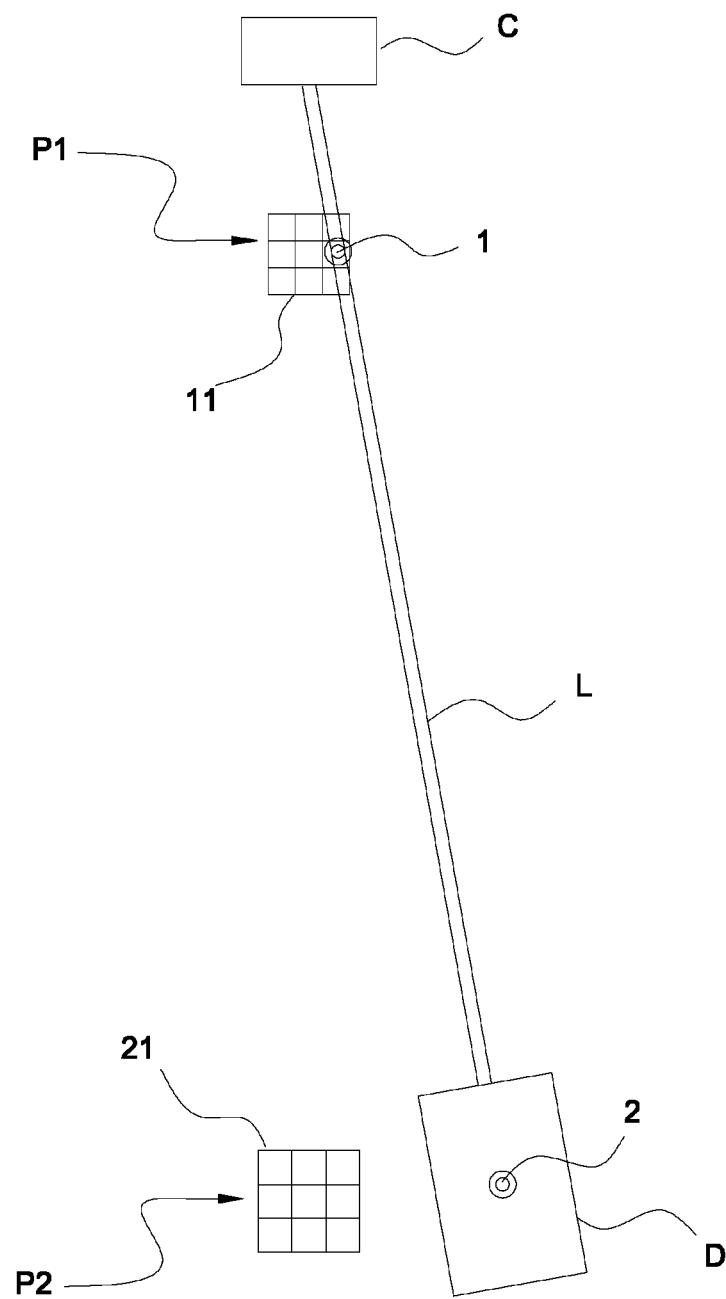
FIG. 4 shows a schematic diagram of transient move of each monitoring point moving with a hanging wire and a load of the present invention.
Figure 5:
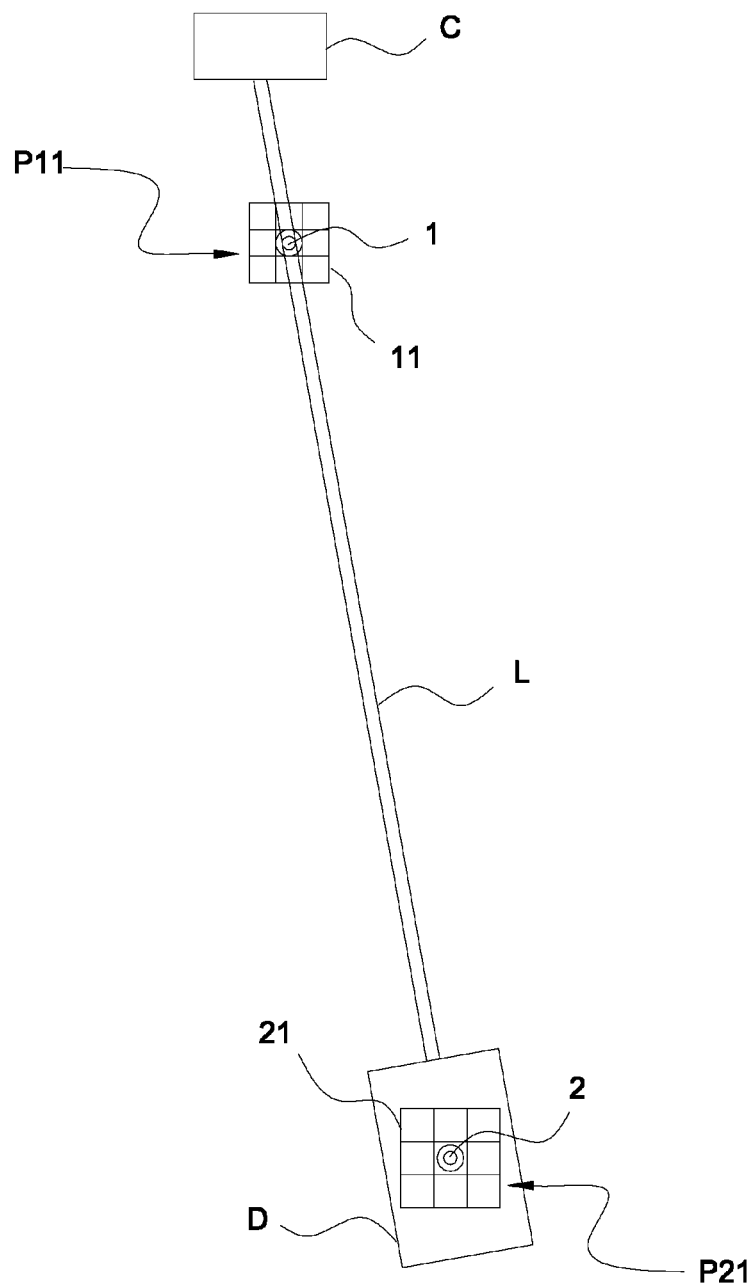
FIG. 5 shows a schematic diagram of each tracking frame following and superimposing the corresponding monitoring point of the present invention.
Figure 6:
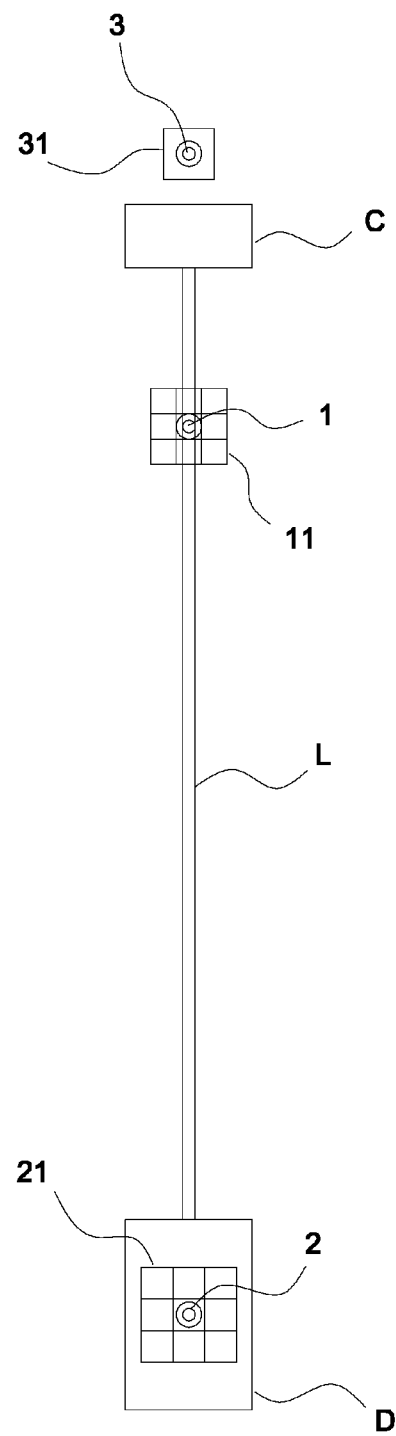
FIG. 6 shows a structure diagram of an additional fixed reference point and a reference frame based on the FIG. 3 of the present invention.

FIG. 6 illustrates another embodiment of the present invention based on the basic structure disclosed in FIG. 3 of the present invention. A fixed reference point 3 and a reference frame 31 are provided on the background of the preset transitional space to match the upper tracking frame 11 and the lower tracking frame 21 to obtain the displacement of the the upper tracking frame 11 and the lower tracking frame 21 while the background image is ignored for reducing the amount of data for processing.

From the above it is understood that the method of reducing computational demand for image tracking of the present invention can further improve the reduction the amount of image data for processing and computational demand to lower the equipment requirements and the cost of equipment acquisition for image tracking control system.

The foregoing invention has been described in detail by way of illustration and example for purposes of clarity and understanding. It will be apparent to those of ordinary skill in the art that variations, changes, modifications and alterations may be applied to the compositions and/or methods described herein without departing from the true spirit, concept and scope of the invention.

What is claimed is:

1. A method of reducing computational demand for image tracking that monitors movement of a load and overhead crane with a plurality of images on real time basis, comprising steps of:
   a) receiving a plurality of images of the load hoisted with hanging wire in a preset transitional space;
   b) setting at least one monitoring point each at the received images of the load and the hanging wire, respectively;
   c) providing a tracking frame at an outer periphery of each monitoring point at the received images of the load and the hanging wire;
   d) allowing each tracking frame to track on its corresponding monitoring point at the received images of the load and the hanging wire and producing a displacement same as the monitoring point; and
   e) calculating the displacement of each tracking frame thus obtaining the displacement of each monitoring point at received images of the load and the hanging wire in correspondence to the tracking frame to calculate the displacement of the hanging wire and the load, respectively, wherein the step a) further comprises a fixed reference point provided on the background of the preset transitional space with a reference frame at outer periphery of the reference point for aid of comparing the displacement with each monitoring point at the received images of the load and the hanging wire and each tracking frame on its corresponding monitoring point.

2. The method of claim 1, wherein the said step b) includes setting a monitoring point at the hanging wire and the load, respectively; and the said step c) comprises providing an upper tracking frame at the outer periphery of the monitoring point of the hanging wire and a lower tracking frame at the outer periphery of monitoring point of the load.

3. The method of claim 2, wherein a setting range of the upper tracking frame is smaller than that of the lower tracking frame.

4. The method of claim 1, wherein each of the monitoring point in the step d) is kept on a relative position of each corresponding tracking frame to carry out tracking of each monitoring point by each corresponding tracking frame.

5. The method of claim 4, wherein each monitoring point is kept on a fixed position within each corresponding tracking frame.

6. The method of claim 4, wherein each monitoring point keeps a fixed distance from a default border line within each corresponding tracking frame.

\* \* \* \* \*